US010112358B2

United States Patent
Bayle et al.

(10) Patent No.: US 10,112,358 B2
(45) Date of Patent: Oct. 30, 2018

(54) PRESS FOR SHAPING PELLETS IN A RESTRICTED AND HOSTILE ENVIRONMENT AND METHOD FOR ASSEMBLING THE PRESS

(71) Applicants: COMMISSARIAT A L'ENERGIE ATOMIQUE ET AUX ENERGIES ALTERNATIVES, Paris (FR); CHAMPALLE, Peronnas (FR)

(72) Inventors: Jean-Philippe Bayle, Villeneuve les Avignon (FR); Patrick Moyer, Bagnols sur Ceze (FR); Christophe Brenneis, Saint Victor la Coste (FR); Patrik Gosset, Bourg en Bresse (FR); Patrick Baptiste, Saint Martin le Chatel (FR); Didier Lager, Mionnay (FR)

(73) Assignees: COMMISSARIAT A L'ENERGIE ATOMIQUE ET AUX ENERGIES ALTERNATIVES, Paris (FR); CHAMPALLE, Peronnas (FR)

( * ) Notice: Subject to any disclaimer, the term of this patent is extended or adjusted under 35 U.S.C. 154(b) by 164 days.

(21) Appl. No.: 15/313,428

(22) PCT Filed: May 26, 2015

(86) PCT No.: PCT/EP2015/061513
§ 371 (c)(1),
(2) Date: Nov. 22, 2016

(87) PCT Pub. No.: WO2015/181121
PCT Pub. Date: Dec. 3, 2015

(65) Prior Publication Data
US 2017/0182724 A1    Jun. 29, 2017

(30) Foreign Application Priority Data
May 27, 2014    (FR) ..................... 14 54780

(51) Int. Cl.
B30B 11/02    (2006.01)
G21C 21/02    (2006.01)
(Continued)

(52) U.S. Cl.
CPC .......... *B30B 11/02* (2013.01); *B30B 15/0011* (2013.01); *B30B 15/026* (2013.01);
(Continued)

(58) Field of Classification Search
CPC ....... B30B 1/007; B30B 11/02; B30B 11/005; B30B 11/007; B22F 3/02
(Continued)

(56) References Cited

U.S. PATENT DOCUMENTS

| 6,334,381 B1 * | 1/2002 | Chatham ................ B21D 28/12 83/588 |
| 9,138,954 B2 * | 9/2015 | Pannewtiz ............ B30B 11/005 |
| 2014/0004220 A1 | 1/2014 | Coudiere |

FOREIGN PATENT DOCUMENTS

| DE | 10 2010 033 988 A1 | 2/2012 |
| EP | 0 347 303 A2 | 12/1989 |
| FR | 2 942 733 A1 | 9/2010 |

OTHER PUBLICATIONS

International Search Report dated Aug. 20, 2015, in PCT/EP2015/061513 filed May 26, 2015.
(Continued)

*Primary Examiner* — Joseph S Del Sole
*Assistant Examiner* — Thu Khanh T Nguyen
(74) *Attorney, Agent, or Firm* — Oblon, McClelland, Maier & Neustadt, L.L.P.

(57) ABSTRACT

A uniaxial press for shaping pellets by compressing powder in a die by punches. The uniaxial press can be used in a restricted and hostile environment and includes small modules that can pass separately through narrow openings, the modules being assembled by placing over columns and by screwing, therefore by remote handling in the confined
(Continued)

space where the press is to operate without requiring any further intervention. The actuation is generally exclusively electromechanical.

23 Claims, 15 Drawing Sheets

(51) Int. Cl.
B30B 15/00 (2006.01)
B30B 15/02 (2006.01)
B30B 15/04 (2006.01)
B30B 15/30 (2006.01)
B22F 3/03 (2006.01)

(52) U.S. Cl.
CPC .......... *B30B 15/028* (2013.01); *B30B 15/045* (2013.01); *B30B 15/304* (2013.01); *G21C 21/02* (2013.01); *B22F 3/03* (2013.01); *B22F 2003/033* (2013.01)

(58) Field of Classification Search
USPC .......................... 425/78, 344–345, 350–355
See application file for complete search history.

(56) References Cited

OTHER PUBLICATIONS

French Search Report dated Feb. 17, 2015, in French Application 14 54780 filed May 27, 2014.

\* cited by examiner

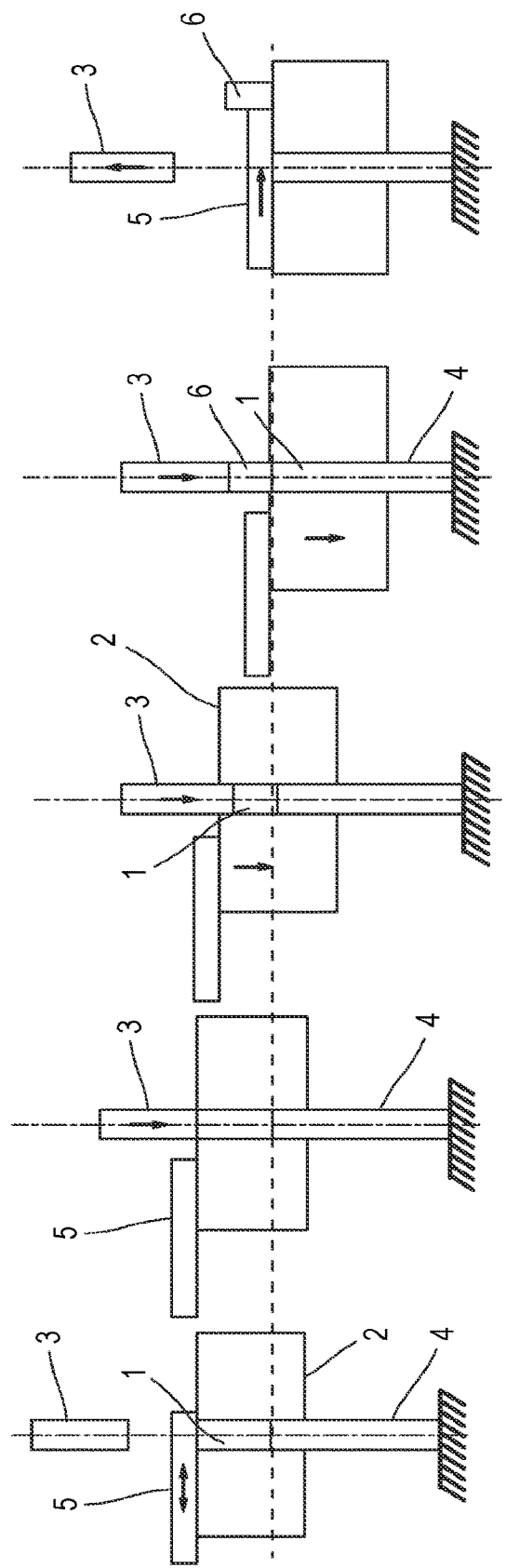

PRESS FOR SHAPING PELLETS IN A RESTRICTED AND HOSTILE ENVIRONMENT AND METHOD FOR ASSEMBLING THE PRESS

The invention deals with a press for shaping pellets in a restricted and hostile environment.

It is of the kind comprising a die and two aligned punches, penetrating in turn the die to compress therein powder which has been poured and make it compact, and then to extract the pellet off the die. Various industries resort to presses of this kind, including pharmacy and nuclear industry, for manufacturing fuel pellets. Many kinds of presses have been published in the art, among which document DE 10 2010 033988 A could be mentioned.

The subject herein is the construction of a compact press and which can be in particular used in the reduced volume of a shielded box. This press should further be modular such that it can be introduced by modules in the box, through narrow openings, of 240 mm in diameter for example; the modules should then be assembled in the shielded box to form the press with reduced handling possibilities due to the small number of available tools and the impossibility of performing accurate or large-force gestures.

Generally, the invention relates to a press of the kind comprising: a die in which pellets are shaped by compression; a first punch called an upper punch and a second punch called a lower punch, the upper punch and the lower punch being aligned with the die and penetrating the die by opposite ends of the die to compress the pellets and mould release them from the die; a lower platen to which the lower punch is fastened; parallel columns, also fastened to the lower platen; a die platen and an upper punch platen to which the die and the upper punch are respectively fastened, and which are slidingly placed onto the columns; an upper motor displacing the upper punch platen and a lower motor displacing the die platen by actuating parts (these characteristics being also present in prior document US 2014/004220). The invention is first original in that the actuating parts of the motors are joined to the die platen and to the upper punch platen by detachable connections comprising screws, the upper punch is joined to the upper punch platen by detachable connections comprising screws, and the lower punch is joined to the lower platen by detachable connections comprising screws.

The connections between modules, being all screwed connections, can be made and unmade without difficulty by working through the wall of a shielded box by a remote handling arm or by using gloves, such that the assembly and disassembly of the press, for maintenance reasons for example, become possible.

The assembly is completed by snap fits comprising in particular placing several platens on the columns, which is not more difficult. The press thus is decomposed into a series of modules, first separated, and then superimposed on the columns, and other modules, first separated as well, and then successively assembled to the previous modules. All these modules can be of small dimensions, to meet requirements of introduction in narrow openings. The columns can make an exception because they are rather high, but they can be introduced as easily by the narrow openings, because they are thin.

The modules can be made more easily remote handleable, by adding to them rods or grip handles, lift-up rings, etc., which moreover can be removable by unscrewing; some examples will be given.

Modules other than those mentioned above, and which are assembled to the rest of the press by other detachable connections of the same kind, are conceivable.

It is contemplated that the actuating part of the lower motor comprises a knuckle connector, joined to the die platen and to an actuating rod of the lower motor, the actuating rod being at a non-zero angle with the columns, which it can in particular be a right angle. The knuckle connector enables the lateral movements of the actuating rod of the lower motor to be converted into vertical movements of the die platen, the lower motor to be offset next to the lower platen and the overall space of the press to be further reduced. The lower motor is then advantageously carried by a lateral support joined to a peripheral face of the lower platen, by another connection comprising detachable screws, and belonging to another module making up the press.

A particular difficulty is the proper placement of the punches, by reducing the risks of damaging them by improper handling. This difficulty can be solved if the press comprises a movable support common to the die block, to the lower punch and to the upper punch, which are joined thereto by detachable screws, this movable support being only used during the transport of the modules of the press and their assembly, and being withdrawn once the press has been assembled and put into an operational state; the die block is a detachable portion of a complementary part of the die platen, and it is fastened to this complementary part by a slider connection and detachable connections comprising screws. With such an arrangement, the movable support maintains the punches at a position being invariable with respect to the die block, when the same is inserted into the complementary part of the die platen; the punches can then be clamped to the upper platen and to the lower platen once these have been moved closer to each other with caution before being released by disassembling the movable support.

According to an advantageous arrangement for making up the mentioned connections, the upper punch, the actuating part of the upper motor and the upper punch are provided with shoulders for bearing on the die platen and the lower platen, and their connections comprise flanges pressing on the shoulders and joined to the die platen and to the lower platen by screws.

The columns can be screwed to the lower platen to enable them to be separately introduced into the shielded box and enhancing the modular nature of the press.

The use of oil is forbidden in important applications of the invention. Thereby, it is contemplated that the press is electromechanical, the lower motor and the upper motor being electric, and are connected to the actuating parts by roller screw mechanisms.

An interesting aspect of the invention also relates to a reliable automated filling of the die with powder at each pressing. The press thereby comprises a module for filling the die, the filling module comprising a support assembled to the die platen by screws, a piece movable with respect to the platen and sliding on the die platen and comprising a bore, and a feed duct, the bore being arranged so as to pass under the feed duct and on the die during displacements of the movable piece. It can also comprise a loading module, comprising a tip screwed to an upper part of the feed duct, a funnel hinged to the tip about an axis, the funnel comprises a recess intersecting the axis, and means for attaching filling bowls on an opening of a passageway of the funnel.

Another aspect of this invention is a method for assembling such a press, which justifies the previous features of its construction.

This press is first designed for use in a space in a hostile medium, with a restricted volume, connected to outside only through narrowed passageways (although it is of course possible to use it elsewhere). Before being assembled, the press thus is in the form of a number of completely separated modules, the dimensions of which are sufficiently small to pass through the passageway leading to the space (some tens centimeter in diameter, for example). The modules are thus introduced one after the other in the space, before being assembled therein, by remote handlers, the movement possibilities of which are reduced and the movements of which are besides inaccurate.

Another aspect of the invention is an assembling method conducted in this way. The assembly is mainly or even exclusively made by sliding movements of the modules to move them closer to each other accurately, before joining them. The attaching is made by screwing. The remote handlers can thus conduct insertions and withdrawals of temporary spacers, in order to temporarily maintain modules at a determined position, until they are completely assembled to each other. Some modules can respectively comprise the lower platen, the upper punch platen and the die platen. Other modules can comprise the upper motor, the lower motor and, possibly, the columns, the knuckle connector, the die block, the filling module and the loading module.

A particular embodiment of the invention will now be described completely in connection with the Fig.s, in which:

FIGS. 1A, 1B, 1C, 1D and 1E show in detail the operational steps of the press;

Figure 9:
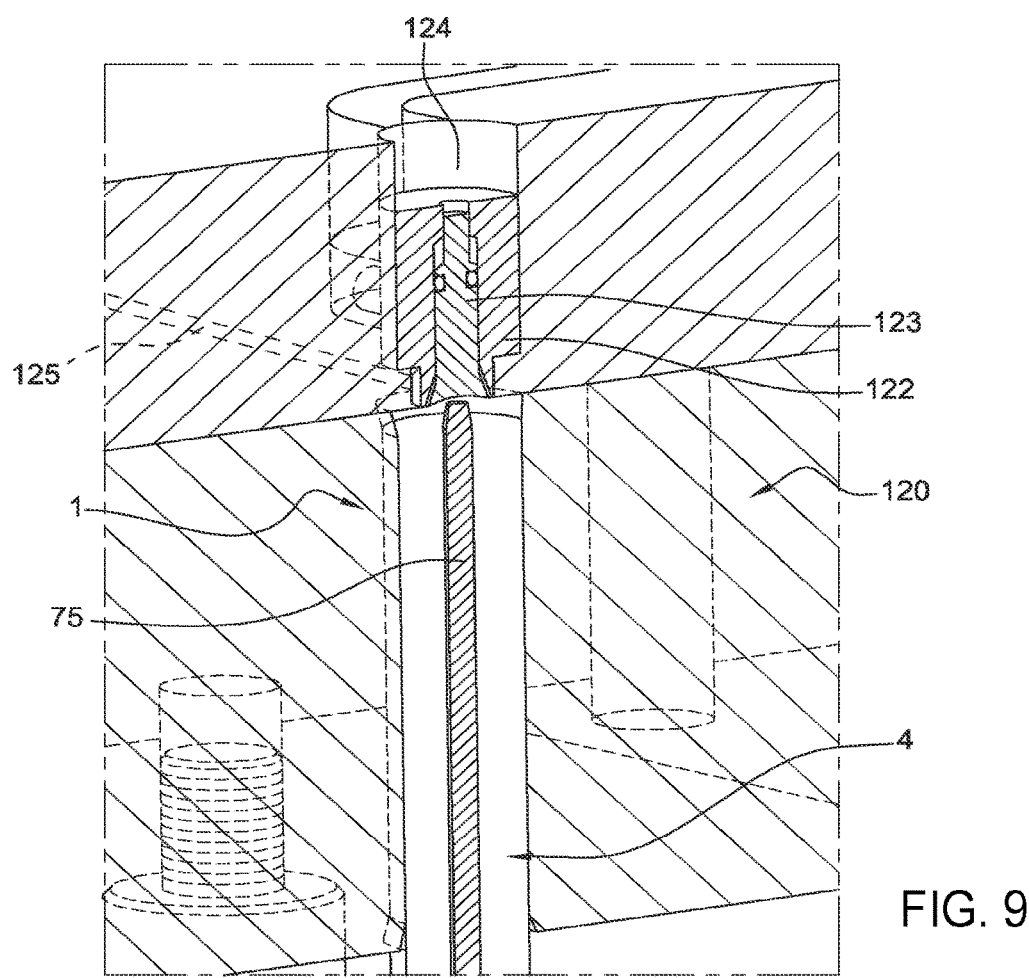

and FIG. 9 is one detail of this mechanism.

One possible mode of manufacturing the pellets will be briefly reminded, which is made by the invention in a preferred embodiment thereof, by means of FIGS. 1A to 1E. A cylindrical shaped die 1 is hollowed in a die platen 2 and opens at its upper and lower faces (FIG. 1A). An upper punch 3 and a lower punch 4 are aligned on either side of the die 1. The lower punch 4 however still penetrates the die 1, whereas the upper punch 3 is lifted above the same at the origin. Thereby, it is possible to move a filling shoe 5 closer to the die platen 2, so as to fill the die 1 with powder. In the next stage (FIG. 1B), the filling shoe 5 being moved apart sidewise, the upper punch 3 is lowered so as to gradually enter the die 1 (FIG. 1C) and compress the powder present, until it is made compact and forms a pellet 6. The die platen 2 can be simultaneously lowered, by a lesser amount, in order to decrease strains due to friction in the die 1. In the next step (FIG. 1D), the die platen 2 is lowered, the punches 3 and 4 remaining in place, which enables the pellet 6 to be mould released from the die 1, now completely occupied by the lower punch 4. Finally (FIG. 1E), the upper piston 3 is raised and the filling shoe 5 advanced again, this time to push back the pellet 6 to a recovery device. Other modes for manufacturing pellets are obviously possible.

Figure 2A:
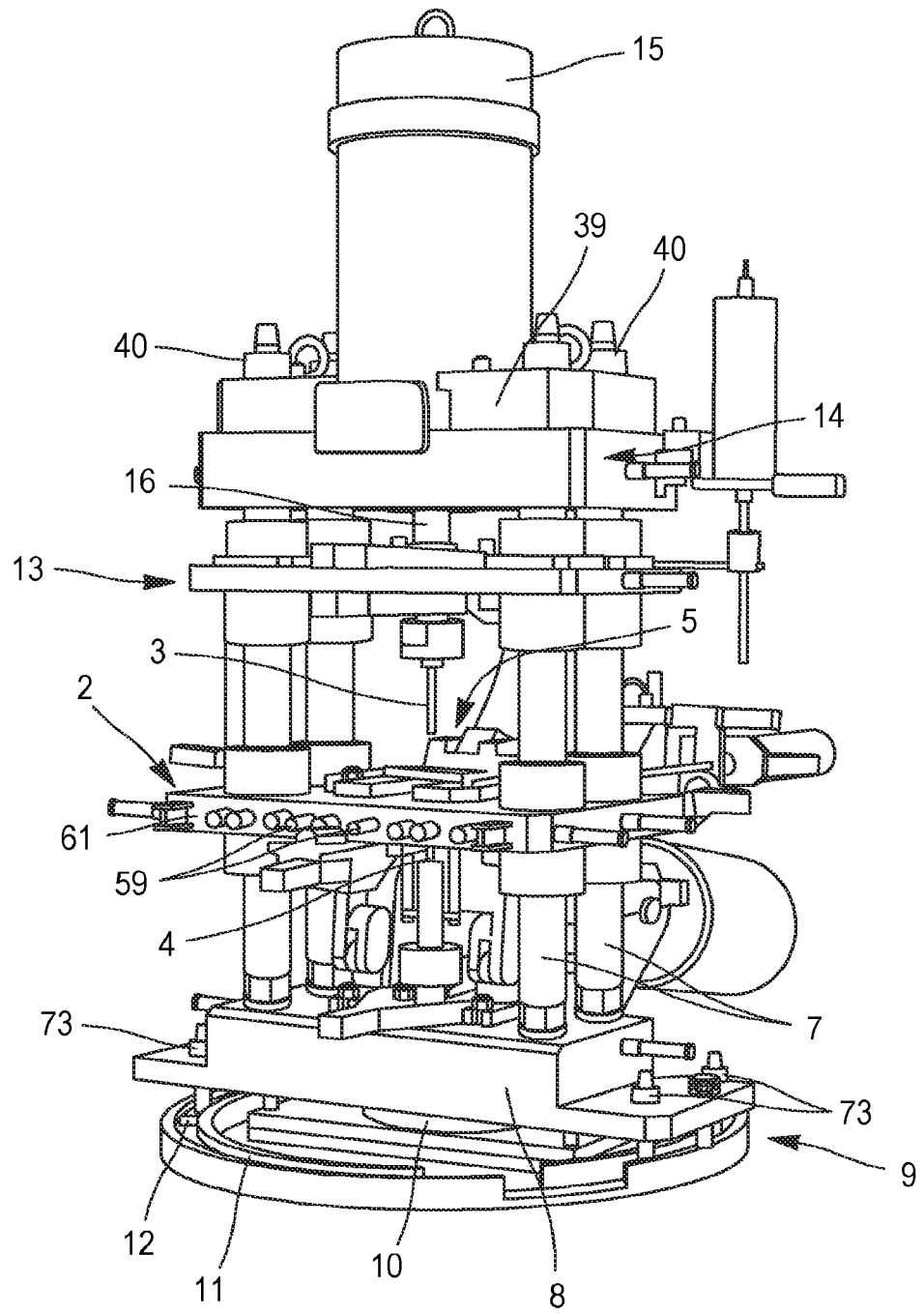
FIGS. 2A and 2B illustrate the main components of the press based on two opposite incidences.
Figure 2B:
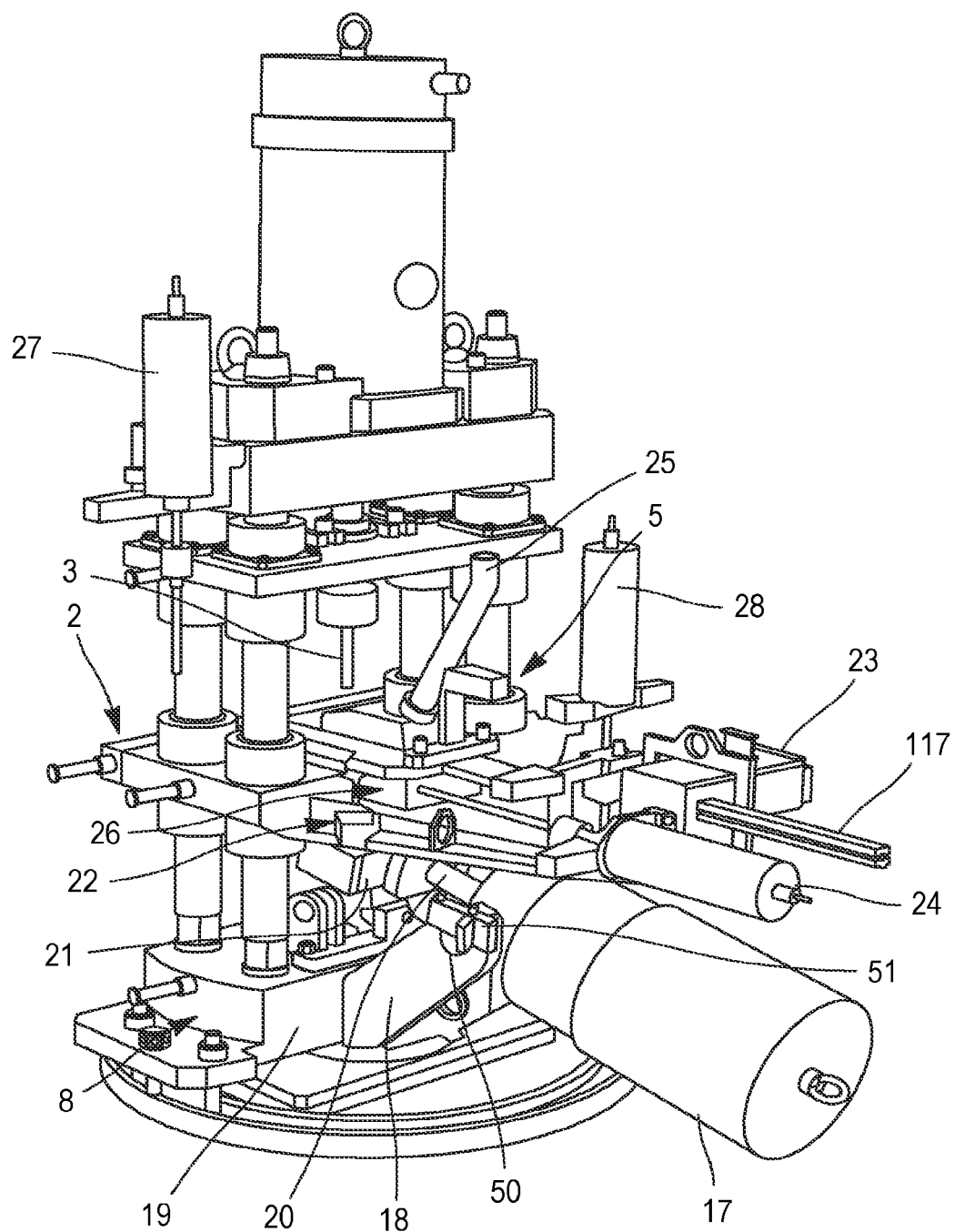
Figure 3A:
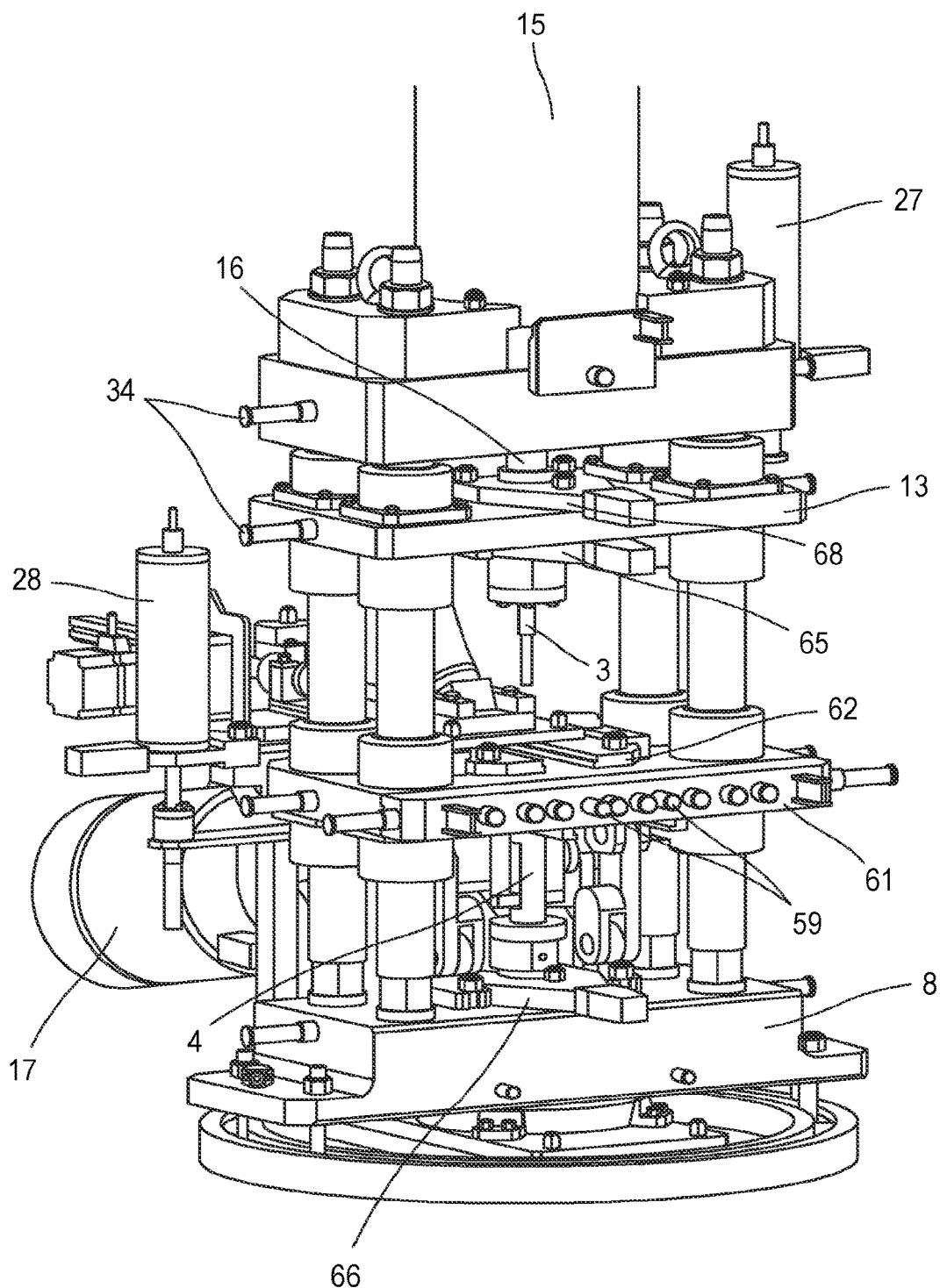
FIGS. 3A and 3B illustrate the press in greater detail, and in particular the connections between modules, still based on two opposite incidences.
Figure 3B:
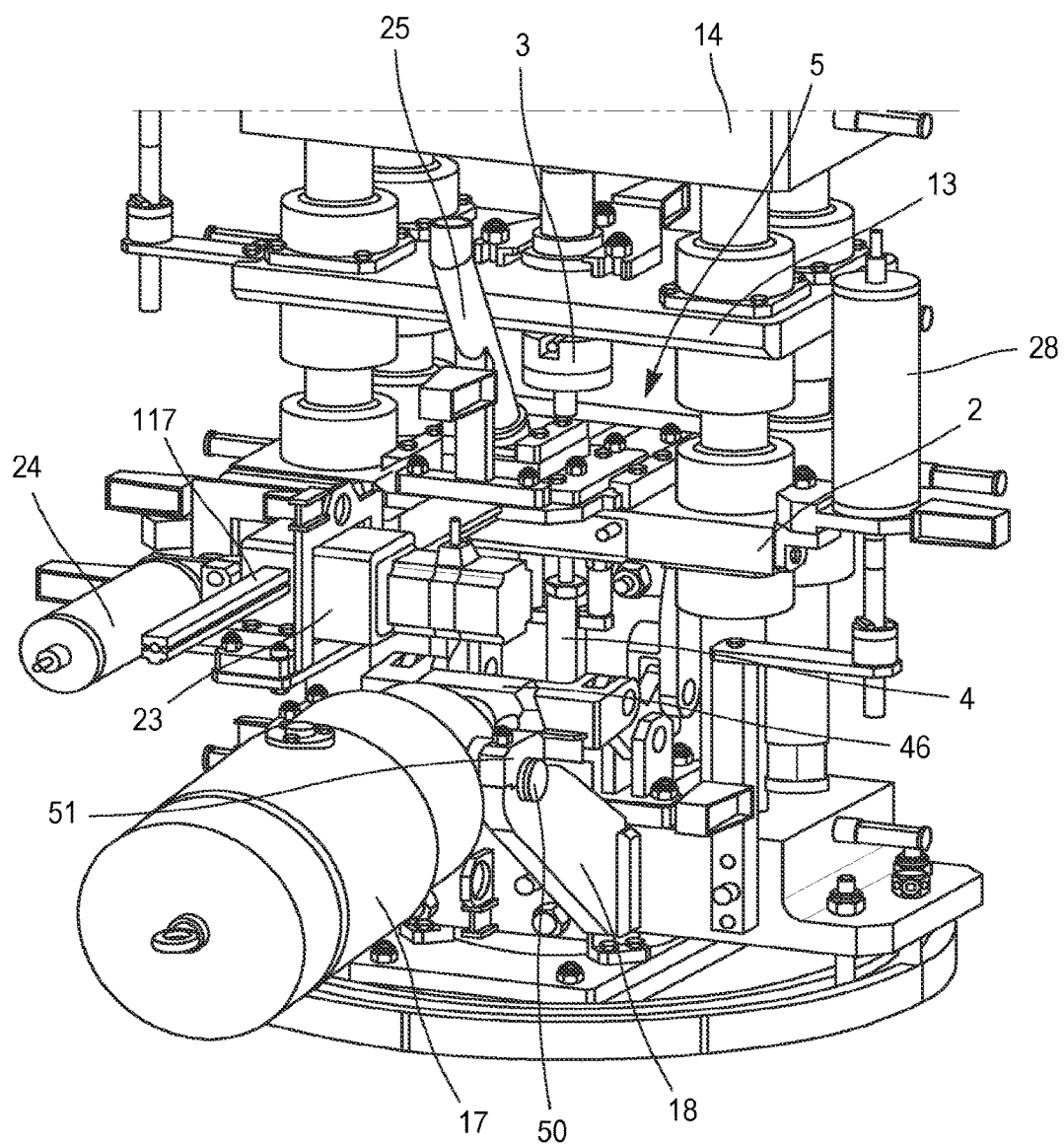

FIGS. 2A and 2B are first referred to, the description of which will be completed thereafter by means of FIGS. 3A and 3B which give more detail for making it. The die platen 2 slides on four columns 7, arranged as a rectangle and oriented in a vertical direction. The lower punch 4 is assembled on a lower platen 8, where the columns 7 are also placed. The lower platen 8 is herein pivoting, assembled to a fixed bracket 9, comprising a central pivot 10 and a circular hollow rail 11. The lower platen 8 is provided with a footprint, which fits to the pivot 10, and has runners 12 fitting in the rail 11. The rotation can be achieved to facilitate assembling and disassembling the press by turning it when necessary.

The runners 12 are provided with locking screws 73, which enable them to be tightened in the rail 11 to immobilise the lower platen 8 and the rest of the press during the manufacture of the pellets.

The upper punch 3 depends on an upper punch platen 13, which also slides on the columns 7. An upper platen 14 is immovably assembled to the top of the columns 7. An upper motor 15, assembled to the upper platen 14, displaces the upper punch platen 13 and the upper punch 3 by the movement of an actuating part 16, and likewise a lower motor 17 displaces the die platen 2. The lower motor 17 is assembled to a lateral support 18, attached to a peripheral face 19 of the lower platen 8, still by a screw detachable connection 70 (FIG. 3B) such that its actuating part 20 is essentially horizontal, in any case at a non-zero angle with the vertical columns 7. Its horizontal movement is converted into a vertical movement by a knuckle connector 21, connecting the actuating parts 20, to the die platen 2.

The filling shoe 5 is assembled to a support 22, attached to the die platen 2 by detachable screws 72, as well as a motor 23 for displacing the filling shoe 5 and a sensor 24 for displacing said shoe; the latter is besides provided with a powder loading system, comprising, in particular, a feed duct 25 and being connectable to a feed module described latter, and an excess powder recovery bowl 26 located under it. An upper displacement sensor 27 is moreover arranged between the upper platen 14 and the upper punch platen 13, and a lower displacement sensor 28, between the lower platen 8 and the die platen 2.

An essential aspect of the invention is that the press is comprised of small dimension modules, that can be easily assembled and disassembled in a shielded box, without significant handling possibilities and without complex tooling. Screw detachable connections are steadily used for this.

As all the modules can be introduced by the same opening of the box, which can be of 240 mm in diameter for example, their dimensions are then lower, except possibly in their direction of introduction through the opening.

Figure 4A:
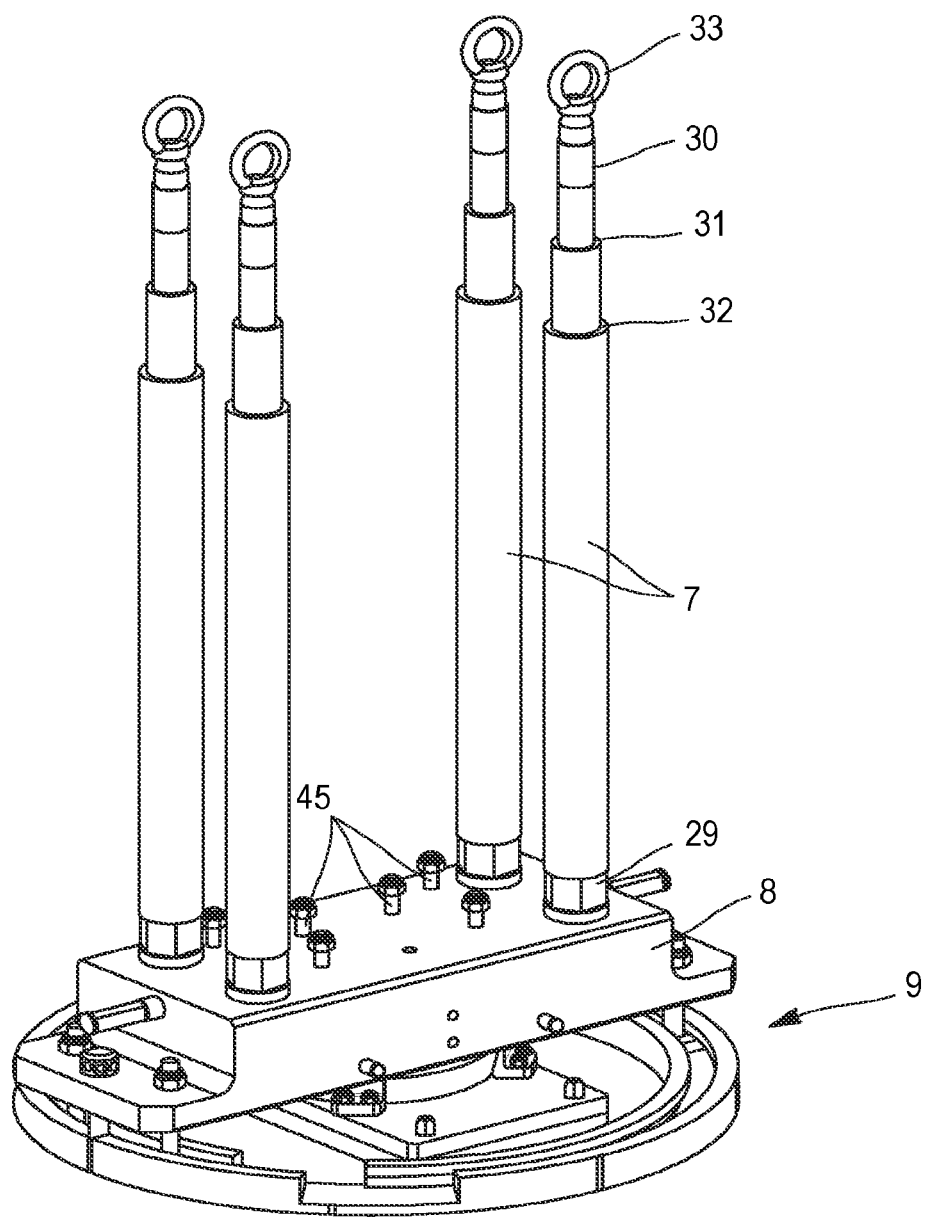
FIGS. 4A, 4B, 4C, 4D, 4E and 4F illustrate different modules of the press in a disassembled state.

The lower platen 8 makes up one of these modules. FIG. 4A represents an initial state, where it has just been laid onto the bracket 9 and where the columns 7 are assembled thereto. However, they have been introduced separately in the shielded box, and they are assembled to the bracket 8 by threaded junctions. Their lower end is provided for this with hexagonal head screw sections 29 enabling them to be screwed. The columns 7 also have threaded ends 30 at the upper end, as well as shoulders 31 and 32, which enlarge the cross-section thereof, just above the upper end thereof; ring nuts 33 are screwed to the threaded parts 30, in order to enable the columns 7 to be handled before being assembled, and they can be withdrawn thereafter.

Figure 4B:
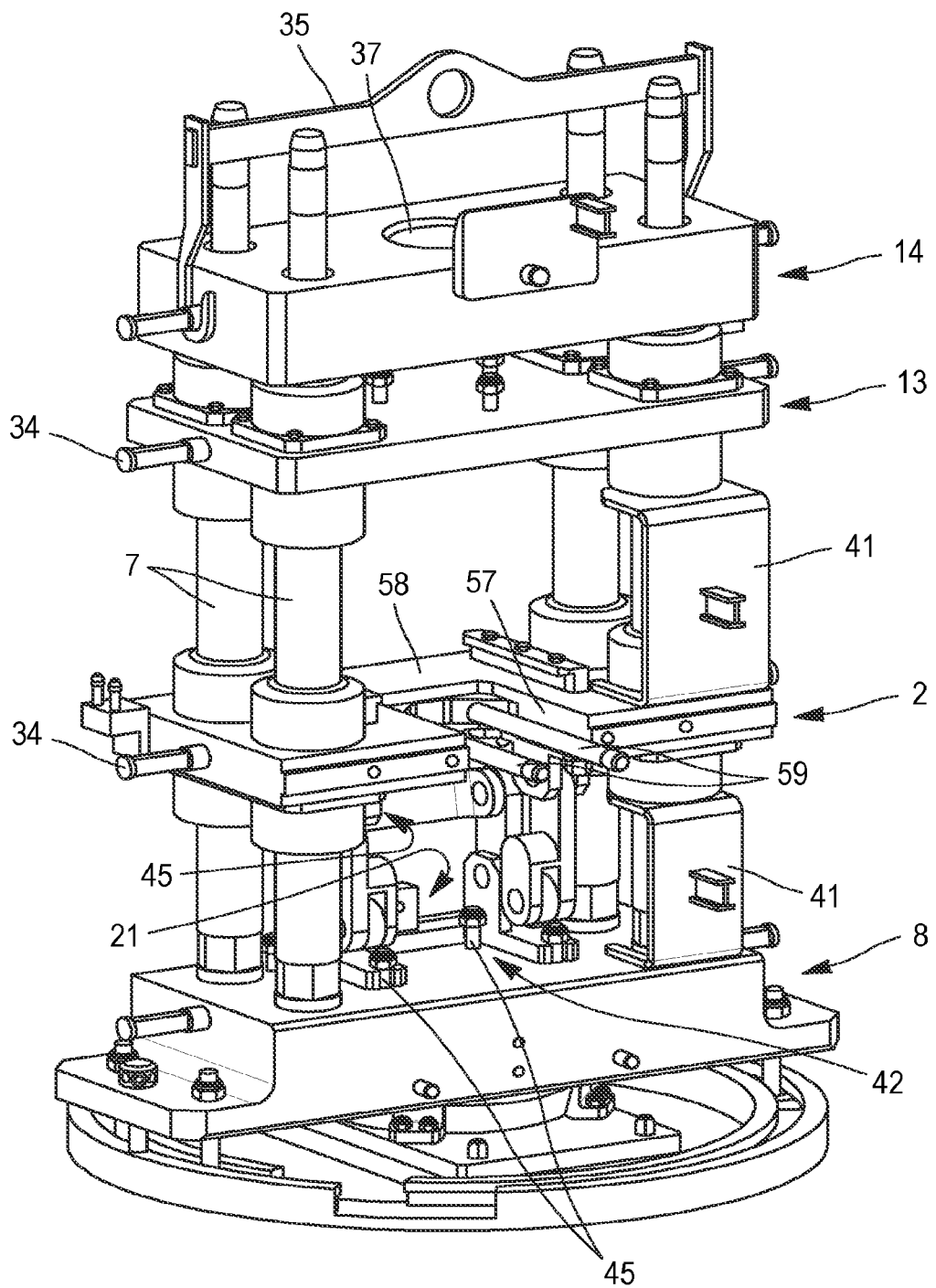
Figure 4C:
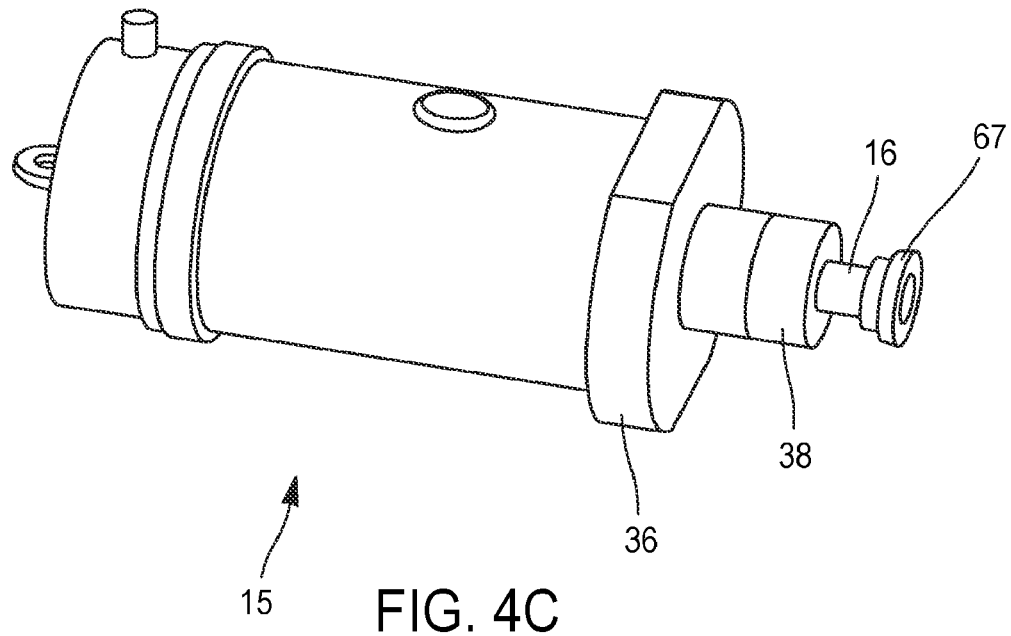

The description of FIG. 4B will now be made, which represents an incomplete assembly state of the press. Another module of the press consists of the upper platen 14, which is installed on the columns 7 once the die platen 2 and the upper punch platen 13 have also been installed therein. All these platens are provided with bores, which enable them to be placed on the columns 7, and the bores of the upper platen 14 are thinner than those of the others, such that the upper platen 14 is retained on the lower shoulders 32. The corresponding assembly state is represented in FIG. 4D. It is noticed that all the platens include a lateral gripping rod 34, enabling them to be gripped and maintained at a horizontal position by a hoist 35, present in the shielded box and only partially represented.

The upper motor 15 makes up another module of the press, and it can be placed once the hoist 35 has been withdrawn. FIG. 4C shows that it has a collar 36, by which it can be vertically laid onto the upper platen 14. A centring bushing 38 extending under the collar 36 penetrates a central port 37 of the upper platen 14 and adjusts the lateral position of the upper motor 15, and the actuating part 16 thereby projects under the upper platen 14. Furthermore, the collar 36 has been screwed prior to a flange 39 (FIG. 2A), provided with gripping rings 71, and with bores enabling it to be also placed on the columns 7. The assembly of the upper motor 15 is made by passing the flange 39 on the upper shoulders 31. Nuts 40 can then be screwed to the threaded ends 30 of the columns 7, to maintain the flange 39 and the upper platen 14. The module, mainly comprised of the upper motor 15 and the flange 39, is thus also easy to be transported and assembled to the rest of the press, and all of its divisions are moderate. Coming back to FIG. 4B, it is seen that fish plates 41 are sandwiched between the lower platen 8, the die platen 2, and the upper punch platen 13, to maintain the same at determined heights.

Another module consists of the knuckle connector 21, represented in FIG. 4D. It includes a lower caliper 42 and an upper caliper 43, each comprising two lateral branches pointing to a same side and a median branch which joins the previous ones, the different branches being provided with steps 44, each opening to the same side, in order to be able to laterally push the knuckle connector 21, by sliding it on the lower platen 8, until screws 45 (FIG. 4B), installed at loose positions on the lower platen 8 and under the die platen 2, enter the respective steps 44 of the lower caliper 42 and the upper caliper 43. The lower caliper 42 will then be fastened to the lower platen 8 and the upper caliper 43 to the die platen 2, once the lower fish plate 41 has been withdrawn, which will enable the die platen 2 to be lowered up to the contact of the upper caliper 43 and the tightening of the screws 45.

The knuckle connector 21 further comprises a median caliper 46, arranged at an intermediate height to the calipers 42 and 43 and extending transversally, a pair of bent levers 47, hinged to the ends of the median caliper 46 at one end, to the lower caliper 42 at their centre, and to rectilinear levers 48 at their opposite end; and the rectilinear levers 48 are hinged to the upper caliper 43. It is seen that a horizontal movement, pushing onto the median caliper 46, produces swinging of the bent levers 47, and raising the rectilinear levers 48, which thereby lift up the upper caliper 43, and consequently the die platen 2.

Figure 4E:
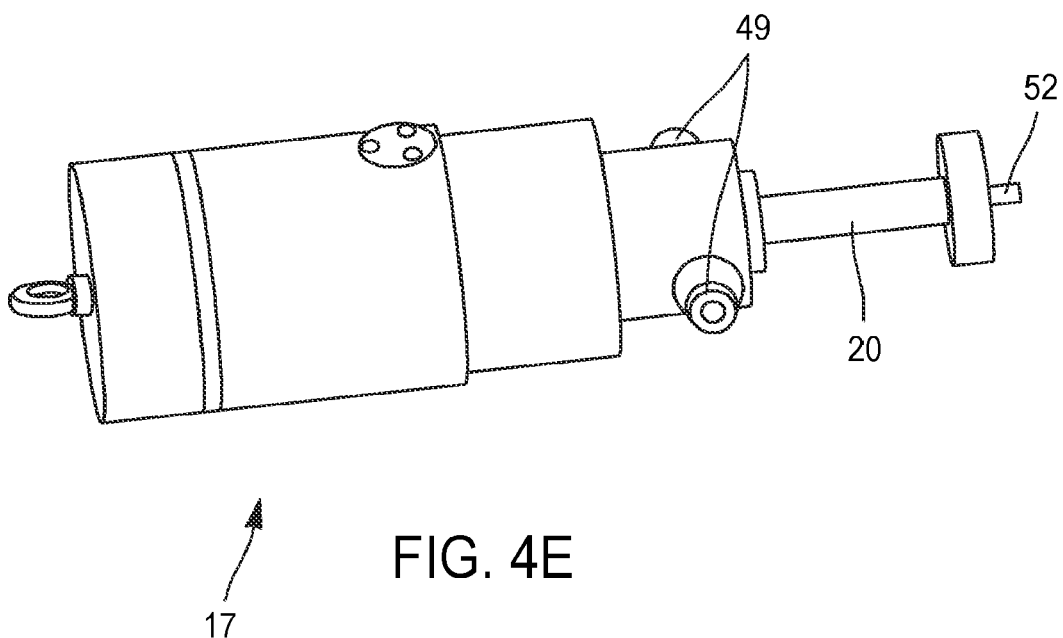
Figure 4D:
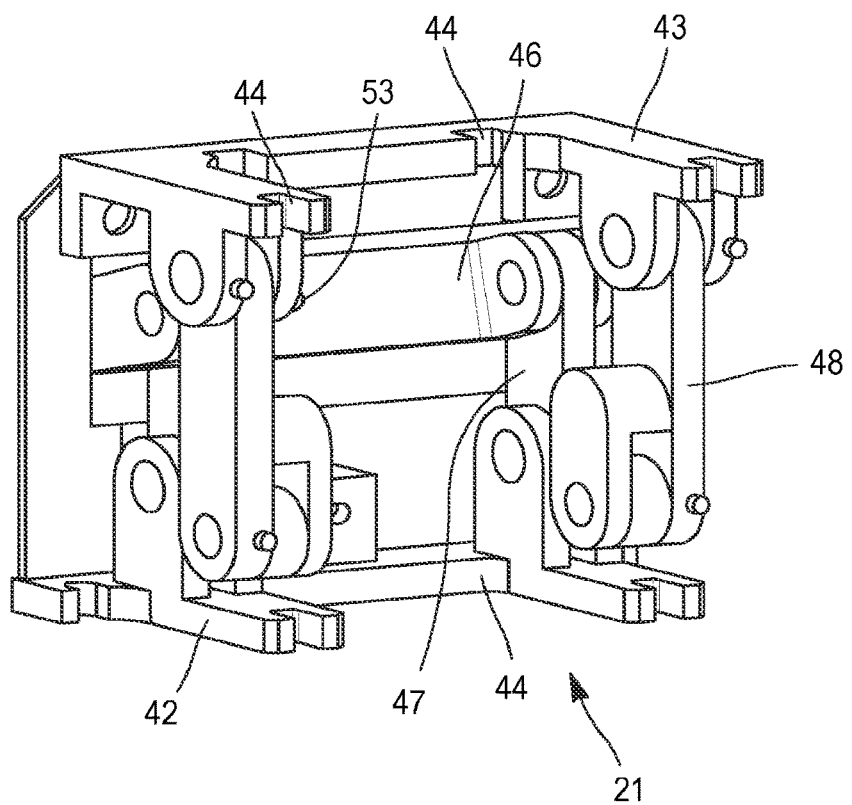

This movement is achieved by the lower motor 17, which makes up another module of the press and is separately represented in FIG. 4E. The previous part, adjacent to the actuating part 20, includes pivots 49, which are fitted into semi-circular notches 50 of the lateral support 18, after which flanges 51 can be screwed on the tabs of the lateral support 18, so as to definitely retain the pivots 49. The lower motor 17 is then pivotably assembled to the lateral support 18. The end of the actuating part 20 includes a threaded rod 52, which can be retained through a bore 53 (FIG. 4D) of the median caliper 46, by screwing a nut thus giving another screw detachable connection. The sliding movements of the actuating part 20, which are essentially horizontal, produce vertical movements of the die platen 2, through the knuckle connector 21.

Figure 4F:
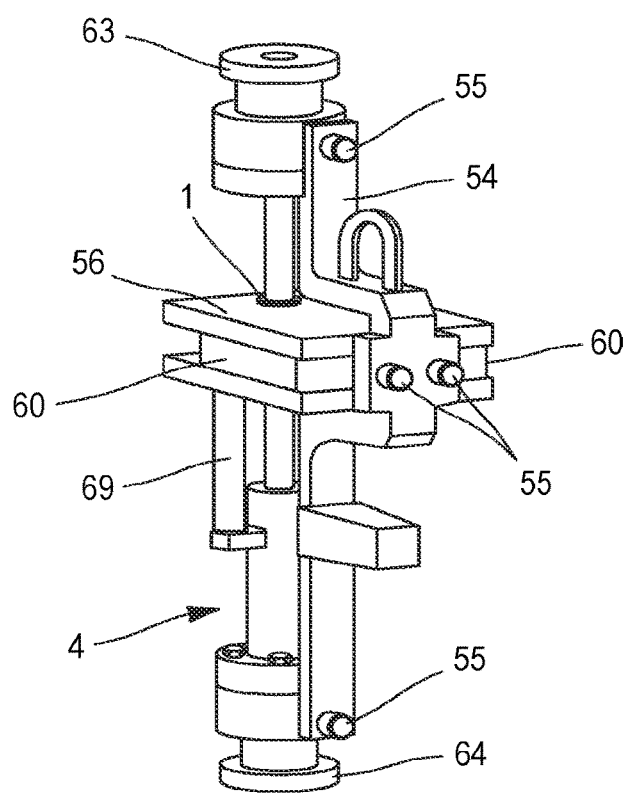

The punches 3 and 4 have not been assembled yet. In the state of FIG. 4B, they are part of another assembly module of the press with, remarkably, the die 1; and this module is represented in FIG. 4F. Indeed, they are assembled to a movable support 54, through screws 55. The die 1 actually belongs to a die block 56, which is part of the die platen 2, by entering a cut-out 57 of a complementary part 58 of this die platen 2, which is actually the only one installed in the state of FIG. 4B. The complementary part 58 carries guide sliders 59, and the die block 56 carries lateral grooves 60, which enable it to be placed on the sliders 59. When this operation is achieved, the position of the die block 56 with respect to the complementary part 58 is ensured by tightening screws 129 of a lateral flange 61 (FIG. 3A), which covers the side of the complementary part 58 where the cut-out 57 opens onto the complementary part 58, which thereby prevents the die block 56, uppers flanges 62, screwed to the upper face of the complementary part 58 and extending above the cut-out 57, and similar lower flanges, but arranged under the lower face of the complementary part 58, from being extracted. By tightening the screws 130 of the upper and lower flanges 62, the die block 56 is retained at the same height as the complementary part 58.

The upper punch 3 and the lower punch 4 respectively carry a shoulder 63 and 64 at their back end (FIG. 4F). Fork-shaped flanges, respectively 65 and 66, are screwed by screws 131 under the upper punch platen 13 and on the lower platen 8, to retain the shoulders 63 and 64 bearing on these surfaces, and thus make the punches 3 and 4 integral with these platens. Likewise, the actuating part 16 of the upper motor 15 comprises a shoulder 67 at its end, that another fork-shaped flange 68, screwed by screws 132 to the upper surface of the upper punch platen 13, maintains against this surface: the upper motor 15 can then drive the upper punch 3.

The fish plates 41 (FIG. 4B) are withdrawn when the die platen 2 and the upper punch platen 13 are retained by the upper motor 15 and the lower motor 16. The movement sensors 27 and 28 are then installed, still by screwing their elements. The support 22 of the filling shoe 5 is installed and screwed to the die platen 2. The screws 55 of the movable support 54 are withdrawn, and the movable support 54 is itself withdrawn: the upper punch 3 and the lower punch 4 are free to come back and forth, and the press is thereby in an operational state. It will be mentioned that the punches 3 and 4 are provided with strain sensors.

Figure 5:
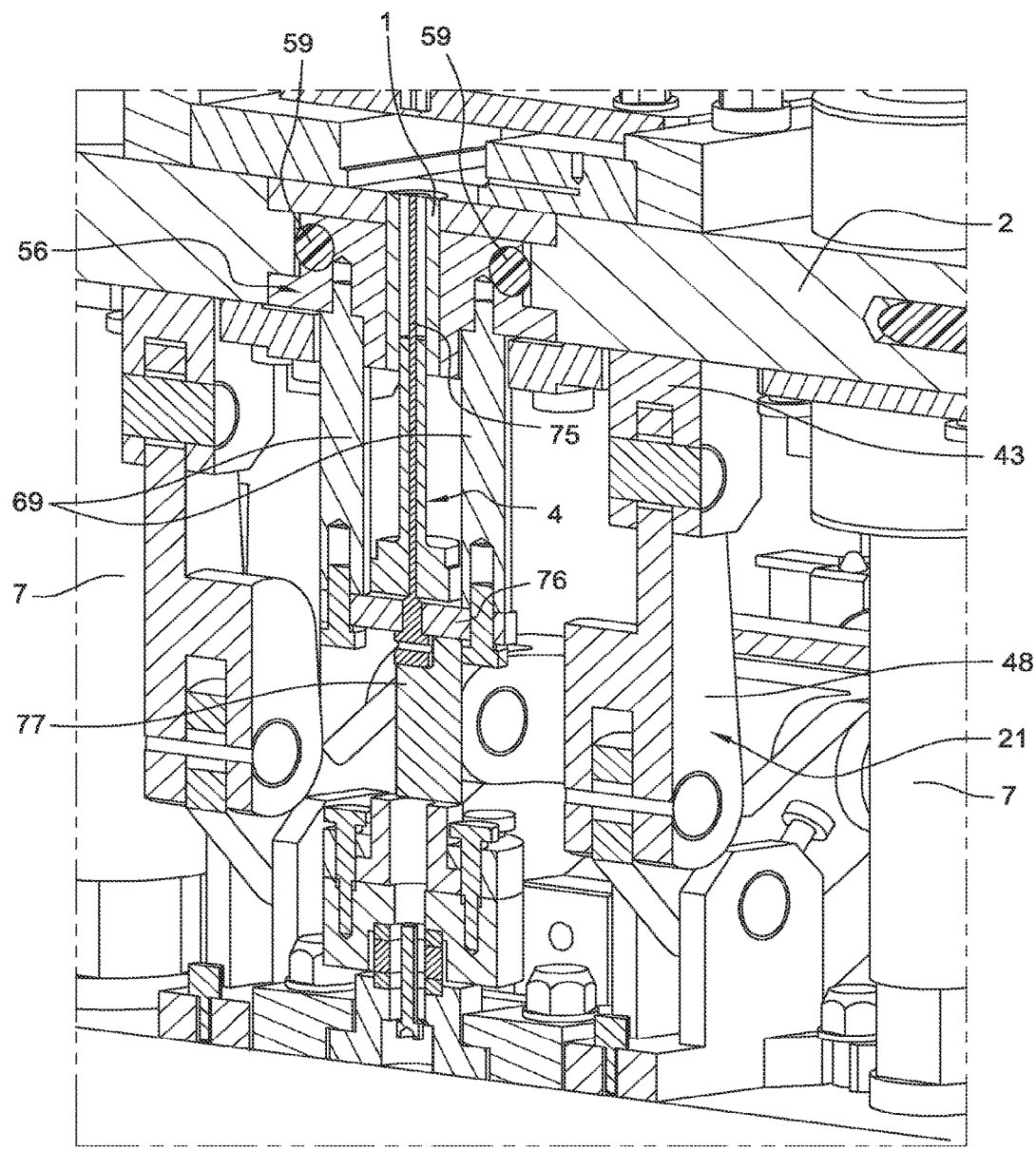
FIG. 5 represents, in a partial cross-section, a particular arrangement of the lower punch.

FIG. 5 is referred to, for further describing the module carrying the die 1 and the punches 3 and 4. The embodiment of the invention can be applied to the shaping of annular pellets, emptied in the centre thereof. A central needle 75 is then arranged in this module, by sliding through the upper part of the lower punch 4, and by projecting upwardly therefrom. The central needle 75 is retained by screwing in a cross bar 76, itself suspended to two tie beams 69, screwed under the die block 56. The lower part of the lower punch 4 includes a recess 77 for moving the cross bar 76. The central needle 75 is flush with the top of the die 1. The method for manufacturing the pellets can thus be explained like this. The upper punch 3 is depressed in the die 1, in the position of the device which is represented in FIG. 5, to compress the powder and shape the pellet; it is emptied in the centre thereof, as the upper part of the punch 4, such that the central needle 75 can also slide therein. When the compression is completed, the upper punch 3 is lifted up and clears the die 1, and then the knuckle connector 21 is swung to lower the die platen 2 and leave the lower punch 3 to depress in the die 1 and to be in charge of extracting the pellet, since the lower punch 4 is immobile. The cross bar 76 goes down into the recess 77, and the central needle 75 remains integral with the die 1 and goes down into the lower punch 4. The reverse movement is then performed to bring the device back to its initial position. Unlike some known devices, the central needle is not associated with a proper motor, to displace it with respect to the die 1. Thus, the device is simplified, while reducing the strains on the central needle 75, since it remains immobile upon compressing the powder. It is likewise advantageous that the central needle 75 is not integral with the lower punch 4, as in other designs, since this raises difficulties upon ejecting pellets.

Figure 6:
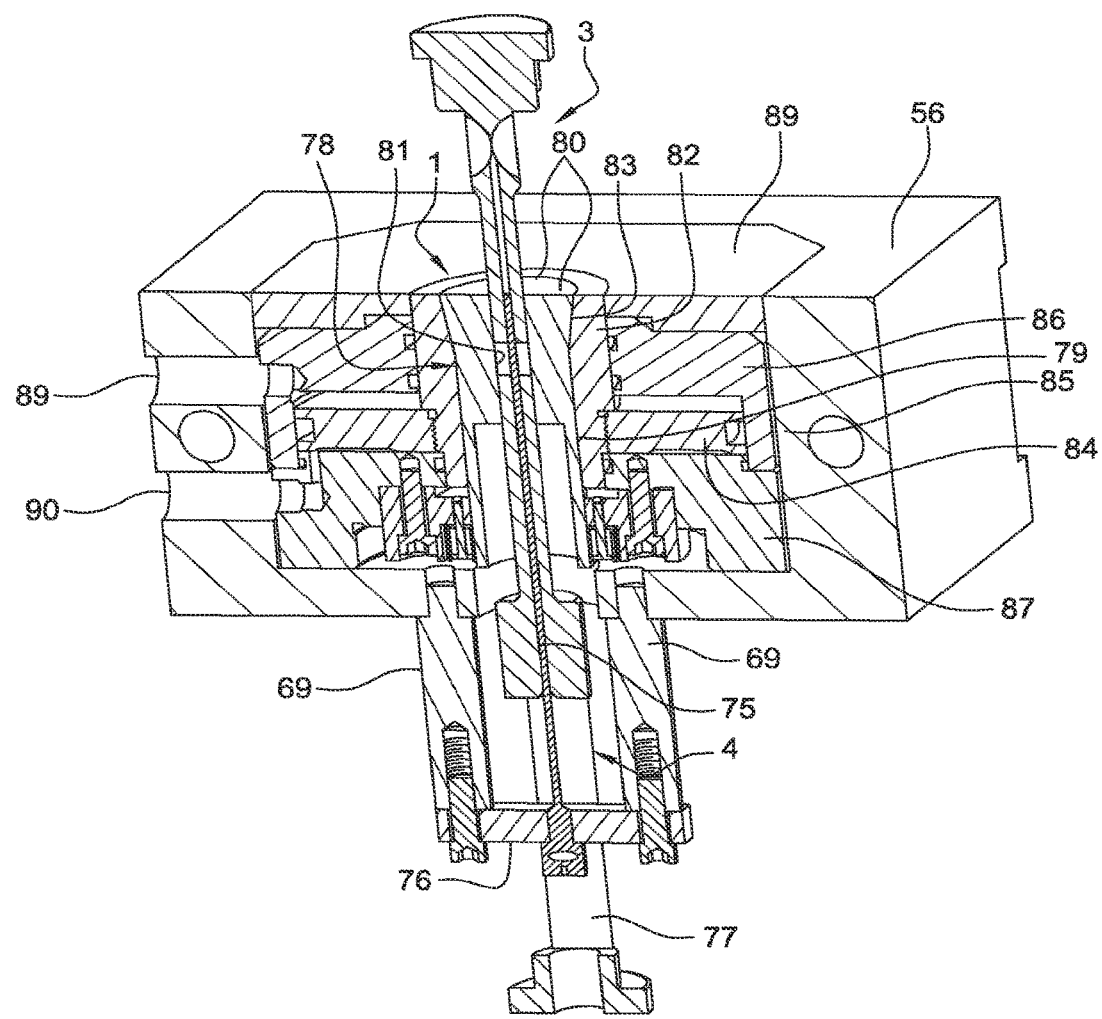
FIG. 6 is a detailed representation of the die, still comprising this lower punch arrangement.

Still further details are shown in FIG. 6. A device can be added to facilitate the extraction of pellets; it is described, in a slightly different form, in document FR-2 942 733-A.

The die block 56 has a complex structure in the centre. The die 1 comprises a central piece 78, comprised of a cylindrical lower base 79, and circle arranged sectors 80 and a piece with the base 79. The sectors 80 are joined at a closing position, close to a free state, and thereby form a continuous moulding inner surface 81.

A sheath 82 is sliding about the central piece 78, in the vertical direction, and it touches the external face of the sectors 80, through a conical interface 83. It is linked to a piston platen 84, which surrounds it and slides in a chamber 85, between an upper flange 86 and a lower flange 87, stacked on each other in a footprint of the die block 56 and tightened by a lid 88, which restores the planarity and the continuity of the upper face of the die block 56. Compressed air feeds 89 and 90 pass through the die block 56 and end in the chamber 85, respectively through the flanges 86 and 87.

The device has been represented in the compression state of the pellets, one of them 91 being retained in the die 1 between the sectors 80 and the punches 3 and 4, and pierced by the central needle 75. During compression, air is insufflated in the duct 90, in order to lift up the piston platen 84, which enables the jointed sectors 80 to be maintained by the cleavage produced by the pair 82 at the conical interface 83. However, when the extraction of the pellet 91 is made, the air pressure is switched to the upper duct 89, which lowers the piston platen 84 and the sheath 82, disjoins the conical interface 83 and allows a slight opening of the sectors 80 outwardly, which causes pressure inside the pellet 91. When the upper punch 3 has been lifted up, the lowering of the die 1, together with the immobility of the lower punch 4, produces the extraction of the pellet 91, with reduced frictions, thanks to the clearance of the sectors 80, which dramatically reduces risks of damaging the pellet 91, during this traditionally delicate extraction step, because of the abrupt variation in the compression stresses the material of the pellets 91 undergoes as they come out of the die 1. The compressed air feeding device is not original and can comprise flexible ducts, which are connected to the ducts 89 and 90.

The following of the description relates to the change in the powder device to shape the pellets, such as 91.

Figure 7A:
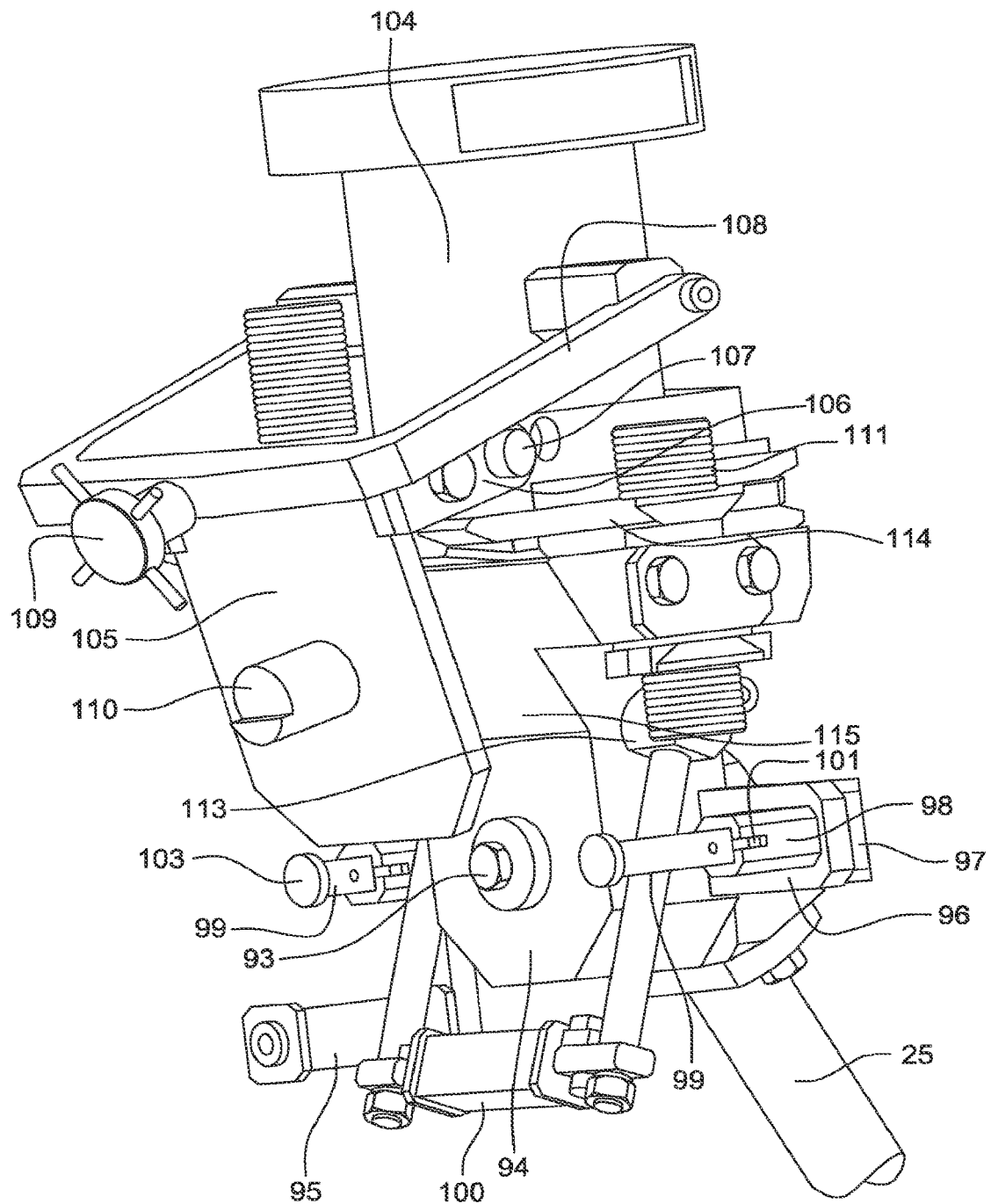
FIGS. 7A, 7B and 7C illustrate a powder feeding device.
Figure 7B:
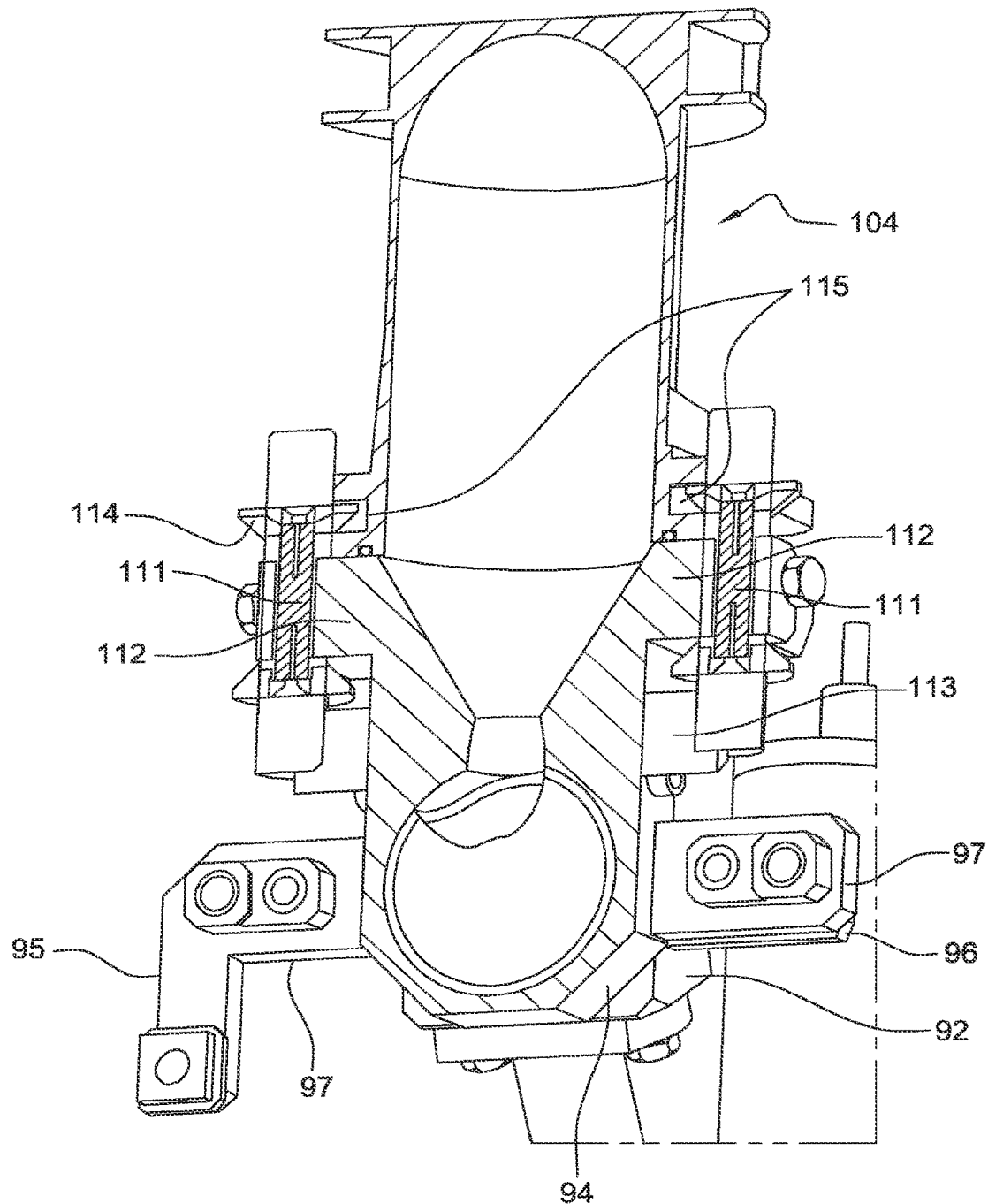
Figure 7C:
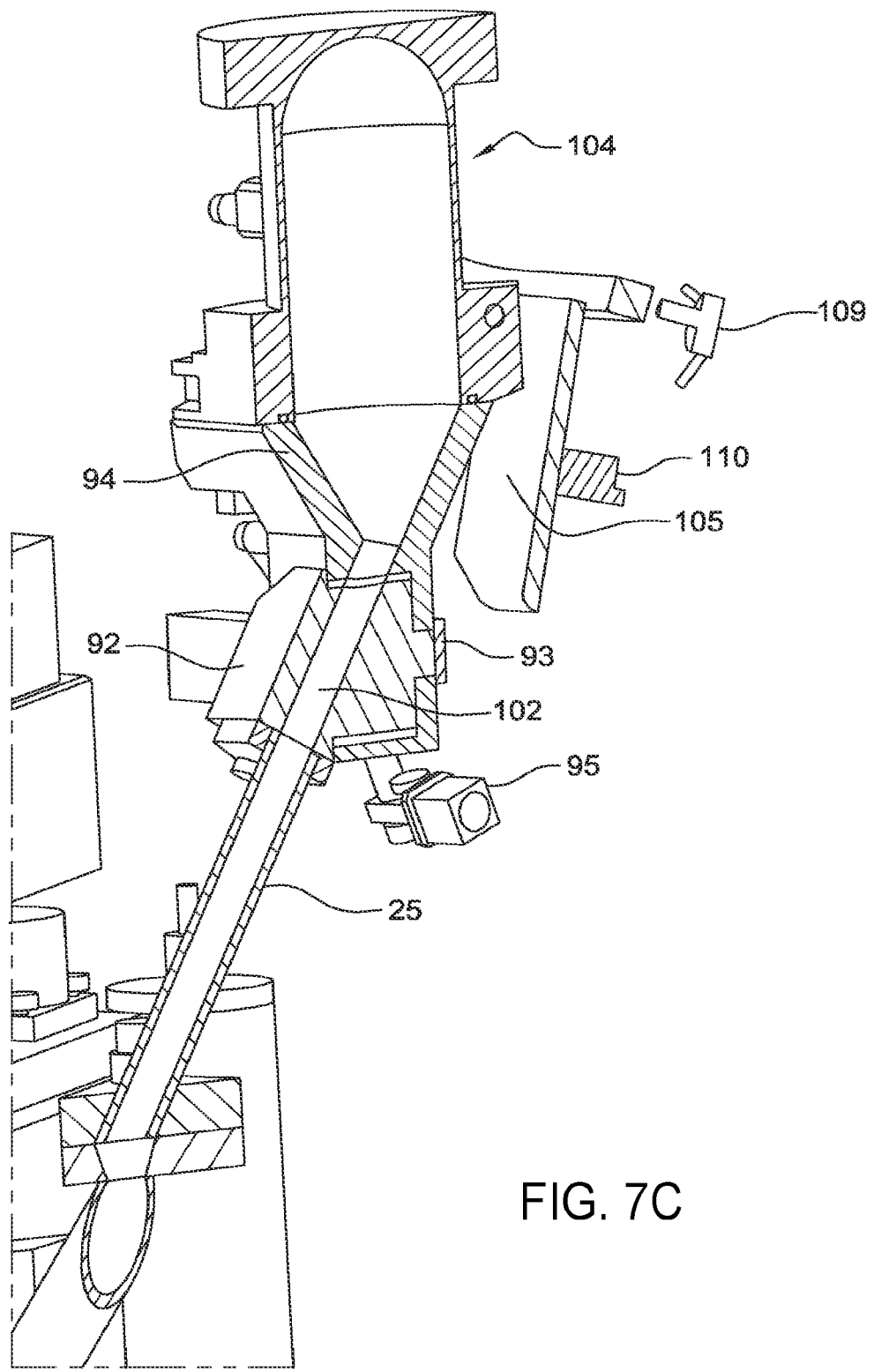

FIGS. 7A, 7B and 7C represent a powder loading module, assembled to the top of the feed duct 25. This module comprises a tip 92 detachably assembled by screws 133 to a flange at the top of the feed duct 25, and it comprises a horizontal axis 93, about which a funnel 94 is rotatable. A handle 95 assembled to the funnel 94 enables this rotation to be achieved. The tip 92 and the funnel 94 are each provided with a pair of tabs, respectively 96 and 97, able to be superimposed and opposite to each other on either side of the axis 93. The tabs 96 and 97 have recesses 98 superimposed when they are aligned, and locks 99, assembled to a second handle 100, have fingers 101, that can be pushed back into the recesses 98 so as to, normally, block rotations of the funnel 94 about the axis 93. The passageway 134 of the funnel 94 intersects the axis 93. The assembly can assume two positions, in one of which the funnel 94 opens upwardly (this position is represented in the Fig. and corresponds to the normal operation of the machine) and the narrowed port of the passageway of the funnel 94 is in a lower position and is joined inside the feed duct 25 through a connecting duct 102, which is an extension of the same through the tip 92; and an opposite position, resulting from a 180° rotation of the funnel 94, causing each of the tabs 97 to come in front of the other tab 96 of the tip 92. To switch from one position to the other, the fingers 101 should be cleared from the recesses 98, by pulling on buttons 103 of the locks 99, it is necessary to turn the funnel 94 about the axis 93 until a new superimposition of the elements 98 is made, and then push back the buttons 103. In this second position, the feed duct 25 and its extension 102 are closed at the top and the funnel 94 opens downwardly.

A filling bowl 104 contains the powder. At the origin, it includes an opening that can be coupled to the opening of the funnel 94, and a lid 105 closing the opening. The lid 105 is hinged to the filling bowl 104 by a first shackle 106, the pivot 107 of which is assembled with a slight clearance. The filling bowl 104 carries a second hinging shackle 108, the axis of rotation of which is parallel to that of the previous hinging shackle 106, and which carries a tightening capstan 109 at the top thereof. When the lid is closed, the end of the tightening capstan 109 can come in front of a tightening anvil 110 of the lid 105 and compress it, which maintains the lid 105 against the opening of the filling bowl 104, while also blocking the second hinging shackle 108 by bridging effect. The filling bowl 104 is then hermetically closed and can be displaced without further caution and coupled to the funnel 94, in the manner that will be described now.

The branches of the second handle 100 act on the locking rods 111, passing through brackets 112 of the funnel 94, by means of connecting sticks 113. When the second handle 100 is pulled, the sticks 113 displace the locking rods 111 by sliding them into the brackets 112, and a fork 114, attached to the tip of the locking rods 111, in front of the opening of the funnel 14, is moved away from this opening.

This is made in the position where the funnel 14 opens downwardly. The bowl 104 is then moved closer to it, its lid 105 at the top thereof. The capstan 109 is untightened and the opening of the filling bowl 104 is slid under that of the funnel 94. The fork 114 then enters lateral grooves 115 set on the side the filling bowl 104, not far from its opening. As the coupling is made through this sliding, the lid 105 opens being retained by an abutment lateral surface 126 of the funnel 94. The second handle 100 is then replaced against the funnel 94 to move the fork 114 closer to the opening of the funnel 14 and retain the filling bowl 104 on it; the locks 99 are open; the first handle 95 is actuated to swing the funnel 14 and the filling bowl 104 and bring it to the position of FIGS. 7A, 7B and 7C in which the content of the filling bowl 104 falls into the funnel 14 and flows through the feed duct 25; and the locks 99 can be replaced.

Figure 8:
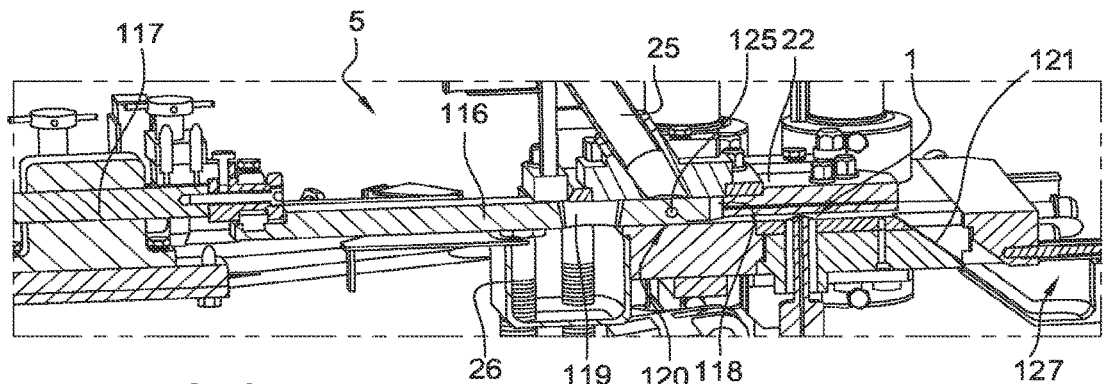
FIG. 8 illustrates the mechanism for distributing powder and ejecting formed pieces.

A last aspect of the invention will be further described by means of FIGS. 8 and 9: it relates to the filling shoe 5.

The filling shoe 5 is still another module for the purposes of the invention, assembled by the screws 72 to the rest of the device. It comprises a movable piece 116, displaced in the support 22 by a slider 117 driven by the motor 23. The movable piece 116 includes a mouth 118 at its opposite end to the slider 117, a bore 119 closer to the slider 117, and a lubricating device 120 between the previous ones. The bore 119 can pass on the filling bowl 26, under the feed duct 25 and on the die 1; the mouth 118 and the lubricating device 120 can thus pass on the die 1, and the mouth 118 can reach a spout 121 for discharging the pellets 91, leading to a bowl 127 for recovering the pellets; the recovering bowl 127 is itself a separable module according to the invention, assembled to the material plate 2 by screws 128.

The back and forth movements of the slider 117 bring the bore 119 under the filling duct 25, such that the bore 119 is filled with powder, and then on the die 1, such that the powder amount necessary to shape a pellet 91 is deposited thereon, and then onto the filling bowl 26, to pour therein the excess powder; in this position, the die 1 is released, and the punches 3 and 4 can make their shaping and extracting work for the pellet 91. The movable piece 116 then comes back, its mouth 118 reaches the pellet 91 which has come out of the die 1 and pushes its back up to the discharging spout 121.

The injector 120 passes above the die 1 during this picking movement of the pellet 91. It delivers a little lubricant, which falls into the die 1 and improves its operation. It comprises a piston 122 movable in a cylinder 123, under the action of a pressurised liquid duct 124. The lubricant flows into a capillary 125, passing through the cylinder 123. When the pressurised liquid is given, the piston 122 is displaced downwardly and its end is released from the cylinder 123, which opens the capillary 125 and enables lubricant to flow through the die 1. The pressure break brings the injector 120 back to the closing state by means of a spring which is not represented.

The upper motor 15 and the lower motor 17 are electric torque motors. Their movement transmission advantageously comprises a roller screw system, in which the rotational movement of the motor is transmitted to a nut, and then by a threaded rod, via satellites, also threaded, arranged between the rod and the nut, according to an arrangement analogous to that of planetary gears. This device has the advantage not to require lubrication, while allowing transmission of significant strains thanks to the high contact surface area.

The roller screw mechanism could be replaced by other mechanisms transforming a rotational movement strain, into a translational movement strain.

The invention claimed is:
1. A press comprising:
a die in which pellets are shaped by compression;
a first upper punch and a second lower punch, the upper punch and the lower punch being aligned with the die and penetrating the die by opposite ends of the die to compress the pellets and extract the pellets from the die;
a lower platen to which the lower punch is fastened;
parallel columns, also fastened to the lower platen;
a die platen and an upper punch platen to which the die and the upper punch are respectively fastened, and which are slidingly placed onto the columns;
an upper motor displacing the upper punch platen and a lower motor displacing the die platen by actuating parts;
wherein the actuating parts of the motors are joined to the die platen and to the upper punch platen by detachable connections comprising screws,
the upper punch is joined to the upper punch platen by detachable connections comprising screws,
the lower punch is joined to the lower platen by detachable connections comprising screws, and
the actuating part of the lower motor comprises a knuckle connector joined to the die platen and to an actuating rod of the lower motor, the actuating rod being at a non-zero angle with the columns.

2. The press according to claim 1, further comprising an upper platen fastened to the columns, opposite to the lower platen along the columns and carrying the upper motor.

3. The press according to claim 2, wherein the lower motor is carried by the lower platen.

4. The press according to claim 3, wherein the lower motor is carried by the lower platen by a lateral support joined to a peripheral face of the lower platen by a detachable connection comprising screws.

5. The press according to claim 1, wherein the die is part of a die block detachable from a complementary part of the die platen and fastened to the complementary part by a slider connection and a detachable connection comprising screws.

6. The press according to claim 5, further comprising a movable support to which the die block, the lower punch, and the upper punch are detachably joined by screws, the screws and the movable support being withdrawn at an operational state of the press.

7. The press according to claim 1, wherein the upper punch, the actuating part of the upper motor and the upper punch include shoulders for bearing on the die platen and the lower platen, and the press comprises flanges pressing on the shoulders and screwed to the die platen and to the lower platen.

8. The press according to claim 1, wherein the columns are screwed to the lower platen.

9. The press according to claim 1, wherein the lower platen is laid on a fixed bracket by a pivot connection and joined to the bracket by a locking connection.

10. The press according to claim 2, wherein the upper platen is retained between shoulders of the columns and detachable nuts screwed to threaded ends of the columns.

11. The press according to claim 1, wherein the lower motor and the upper motor are electric.

12. The press according to claim 11, wherein the lower motor and the upper motor are connected to the actuating parts by mechanisms transforming a rotational movement strain into a translational movement strain.

13. The press according to claim 1, further comprising a filling module of the die, the filling module comprising a support assembled to the die platen by screws, a piece movable with respect to the platen and sliding on the die platen and comprising a bore, and a feed duct, the bore being disposed to pass under the feed duct and on the die during displacements of the movable piece.

14. The press according to claim 13, wherein the movable piece comprises a mouth at one end, passing on the die and in front of a spout for discharging the pellets shaped during the displacements of the movable piece.

15. The press according to claim 13, wherein the movable piece comprises a lubricant injector passing on the die during the displacements of the movable piece.

16. The press according to claim 13, further comprising a loading module, comprising a tip screwed to an upper part of the feed duct, a funnel hinged to the tip about an axis, the funnel comprises a recess intersecting the axis, and means for attaching filling bowls on an opening of a passageway of the funnel.

17. The press according to claim 1, further comprising a needle sliding in the lower punch and penetrating the die.

18. The press according to claim 17, wherein the needle is suspended to the die platen by tie beams and a cross bar joining the tie beams, and the lower punch comprises a recess through which the cross bar extends and in which it is movable.

19. The press according to claim 1, wherein the die comprises distinct sectors and a sheath surrounding the sectors, the sheath being translationally movable, the sheath and the sectors being joined at a conical interface.

20. A method for assembling a press including: a die in which pellets are shaped by compression; a first upper punch and a second lower punch, the upper punch and the lower punch being aligned with the die and penetrating the die by opposite ends of the die to compress the pellets and extract them from the die; a lower platen to which the lower punch is fastened; parallel columns, also fastened to the lower platen; a die platen and an upper punch platen to which the die and the upper punch are respectively fastened, and which are slidingly placed onto the columns; an upper motor displacing the upper punch platen and a lower motor displacing the die platen by actuating parts; wherein the actuating parts of the motors are joined to the die platen and to the upper punch platen by detachable connections comprising screws, the upper punch is joined to the upper punch platen by detachable connections comprising screws, the lower punch is joined to the lower platen by detachable connections comprising screws and the actuating part of the lower motor includes a knuckle connector joined to the die platen and to an actuating rod of the lower motor, the actuating rod being at a non-zero angle with the columns, the method comprising:

separately introducing modules making of the press in a space where a hostile medium prevails through passageways connecting the space to an external medium; and assembling the modules in the space by remote handlers exclusively.

21. The assembling method according to claim 20, wherein the lower platen, the upper punch platen, and the die platen belong to some of the modules, all different from the press.

22. The assembling method according to claim 21, wherein the upper motor, the lower motor, and the columns, the knuckle connector, the die block, the filling module and the loading module belong to some other modules, all different from the press.

23. The assembling method according to claim 20, wherein the assembly is exclusively performed by sliding movements, screwing, and inserting and removing temporary spacers.

* * * * *